US010339925B1

(12) United States Patent
Rastrow et al.

(10) Patent No.: US 10,339,925 B1
(45) Date of Patent: Jul. 2, 2019

(54) GENERATION OF AUTOMATED MESSAGE RESPONSES

(71) Applicant: Amazon Technologies, Inc., Seattle, WA (US)

(72) Inventors: Ariya Rastrow, Seattle, WA (US); Tony Hardie, Seattle, WA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/276,316

(22) Filed: Sep. 26, 2016

(51) Int. Cl.
| | |
|---|---|
| *G10L 21/00* | (2013.01) |
| *G10L 13/00* | (2006.01) |
| *G10L 15/22* | (2006.01) |
| *G10L 15/18* | (2013.01) |
| *G10L 13/10* | (2013.01) |
| *H04L 12/58* | (2006.01) |
| *H04L 29/08* | (2006.01) |

(52) U.S. Cl.
CPC .............. *G10L 15/22* (2013.01); *G10L 13/10* (2013.01); *G10L 15/1815* (2013.01); *H04L 51/02* (2013.01); *H04L 67/306* (2013.01); *G10L 2015/223* (2013.01)

(58) Field of Classification Search
CPC .......... G06F 15/16; G10L 21/00; G10L 13/00
USPC ......................................... 704/206, 260, 275
See application file for complete search history.

(56) References Cited

U.S. PATENT DOCUMENTS

| | | | | | |
|---|---|---|---|---|---|
| 2,106,653 | A | * | 1/1938 | Podgurski | G04D 7/081 33/203.1 |
| 5,860,064 | A | * | 1/1999 | Henton | G10L 13/033 204/266 |
| 6,810,378 | B2 | * | 10/2004 | Kochanski | G10L 13/10 704/258 |
| 8,428,952 | B2 | * | 4/2013 | Niemeyer | G10L 13/02 704/258 |
| 8,638,908 | B2 | * | 1/2014 | Leeds | H04M 1/57 379/164 |
| 8,645,841 | B2 | * | 2/2014 | Ghosh | G06Q 10/109 709/206 |
| 8,666,746 | B2 | * | 3/2014 | Bangalore | G10L 13/06 704/258 |
| 8,886,537 | B2 | * | 11/2014 | Goldberg | G10L 13/033 704/258 |

(Continued)

*Primary Examiner* — Seong-Ah A Shin
(74) *Attorney, Agent, or Firm* — Pierce Atwood LLP

(57) ABSTRACT

Systems, methods, and devices for computer-generating responses and sending responses to communications when the recipient of the communication is unavailable are disclosed. An individual may send a message (either audio or text) to a recipient. The recipient may be unavailable to contemporaneously respond to the message (e.g., the recipient may be performing an action that makes is difficult or impractical for the recipient to contemporaneously respond to the audio message). When the recipient is unavailable, a response to the message is generated and sent without receiving an instruction from the recipient to do so. The response may be sent to the message originating individual, and content of the response may thereafter be sent to the recipient to receive feedback regarding the correctness of the response. Alternatively, the response content may first be sent to the recipient to receive the feedback, and thereafter the response may be sent to the message originating individual.

20 Claims, 17 Drawing Sheets

(56) References Cited

U.S. PATENT DOCUMENTS

| | | | | |
|---|---|---|---|---|
| 8,918,322 B1* | 12/2014 | Acker | .................... | G10L 13/02 |
| | | | | 704/258 |
| 9,319,504 B2* | 4/2016 | Schroeter | .............. | G10L 13/043 |
| 9,886,953 B2* | 2/2018 | Lemay | .................... | G10L 15/28 |
| 2004/0193421 A1* | 9/2004 | Blass | .................... | G06F 17/278 |
| | | | | 704/258 |
| 2005/0096909 A1* | 5/2005 | Bakis | .................... | G10L 13/027 |
| | | | | 704/260 |
| 2007/0192418 A1* | 8/2007 | Adams | .................... | H04L 51/00 |
| | | | | 709/206 |
| 2008/0235024 A1* | 9/2008 | Goldberg | .............. | G10L 13/033 |
| | | | | 704/260 |
| 2011/0320960 A1* | 12/2011 | Cai | ........................ | H04L 51/02 |
| | | | | 715/752 |
| 2012/0221336 A1* | 8/2012 | Degani | .................. | G10L 15/06 |
| | | | | 704/250 |
| 2013/0080177 A1* | 3/2013 | Chen | ....................... | G10L 15/26 |
| | | | | 704/275 |
| 2013/0203393 A1* | 8/2013 | Bugalia | .................. | H04W 4/16 |
| | | | | 455/414.1 |
| 2016/0093289 A1* | 3/2016 | Pollet | .................... | G10L 13/047 |
| | | | | 704/260 |

* cited by examiner

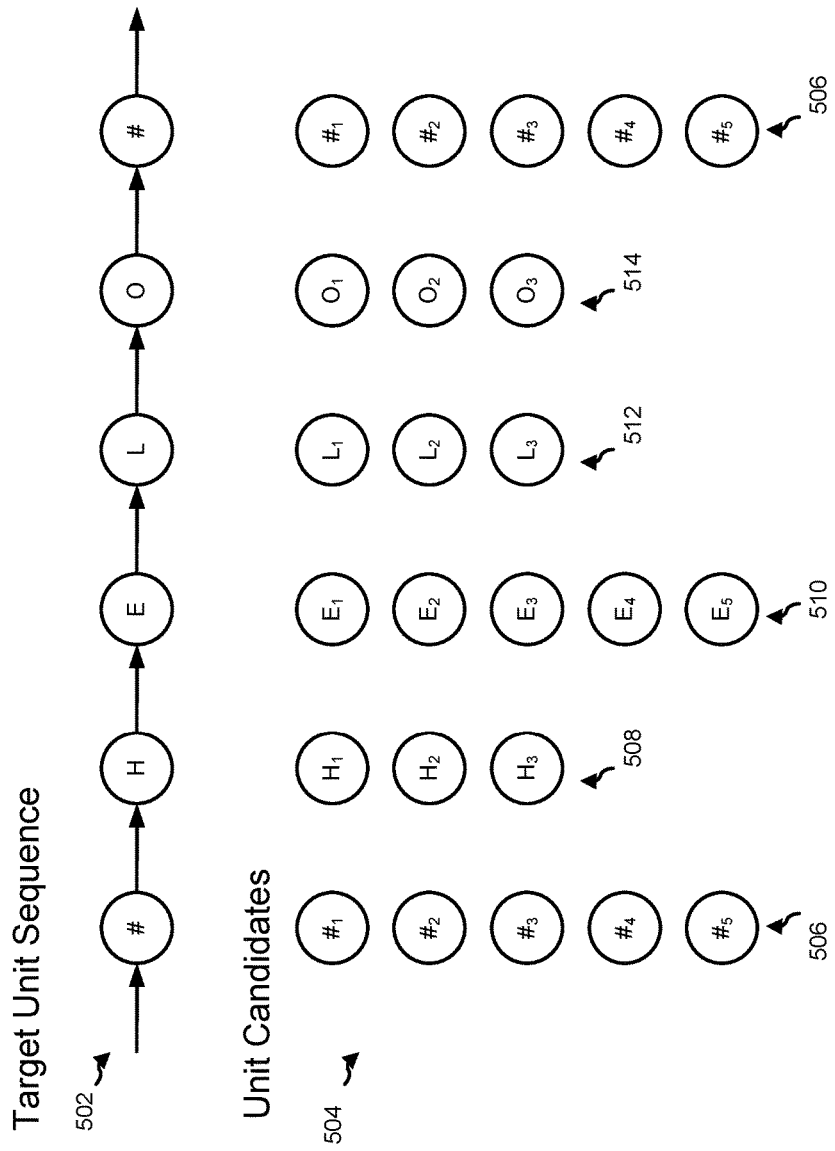

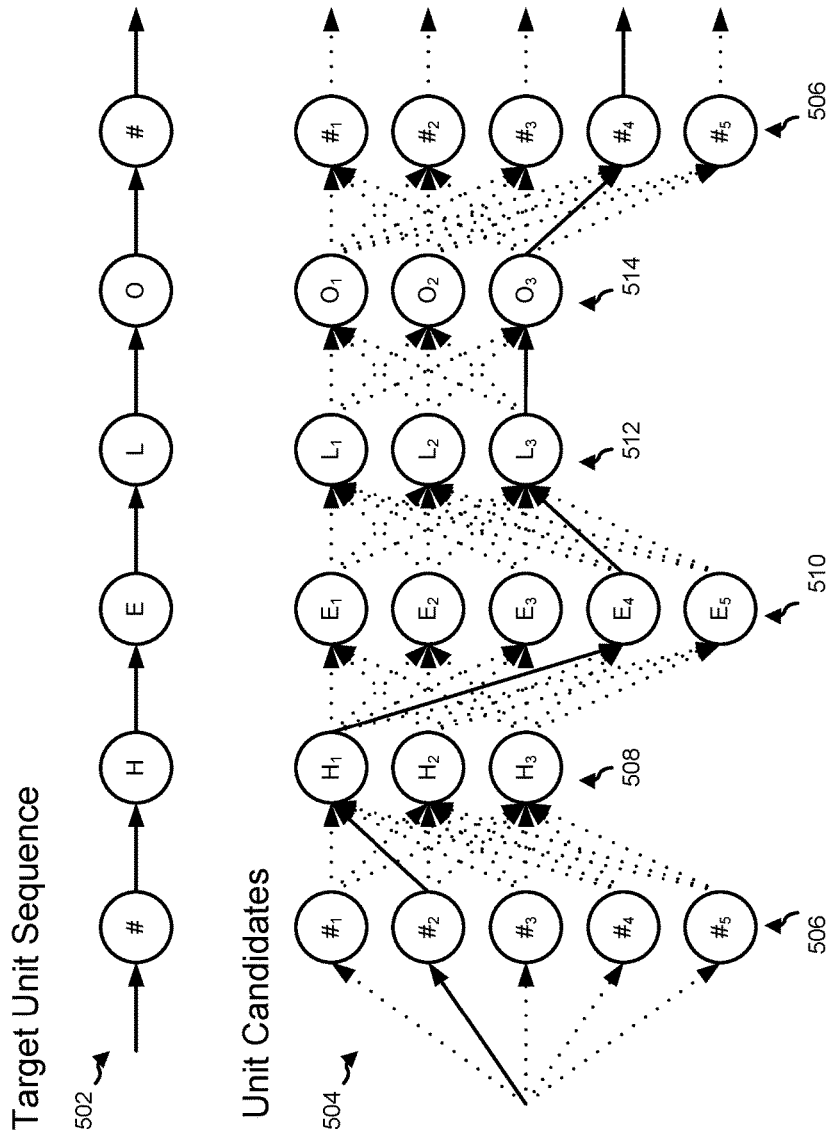

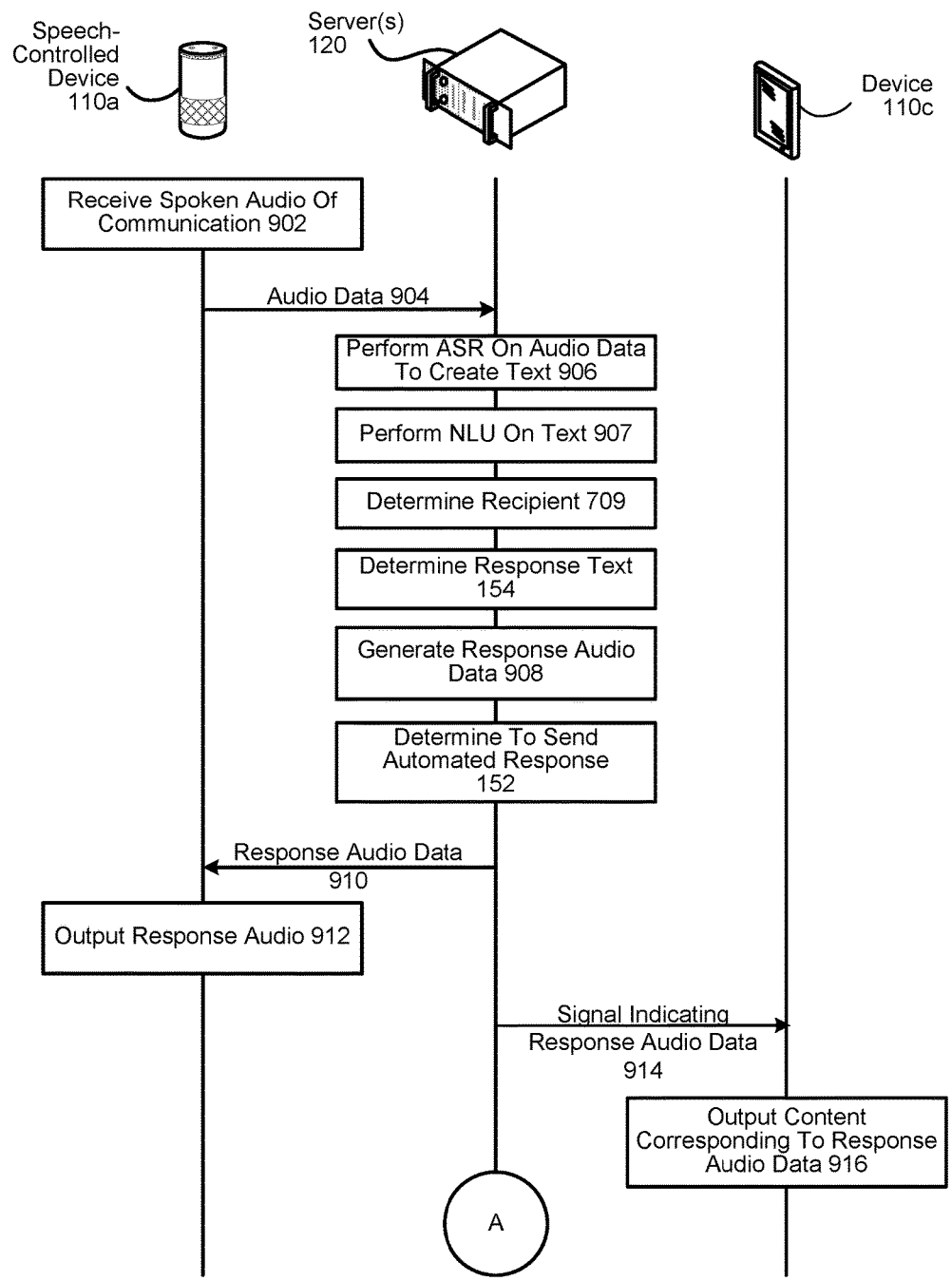

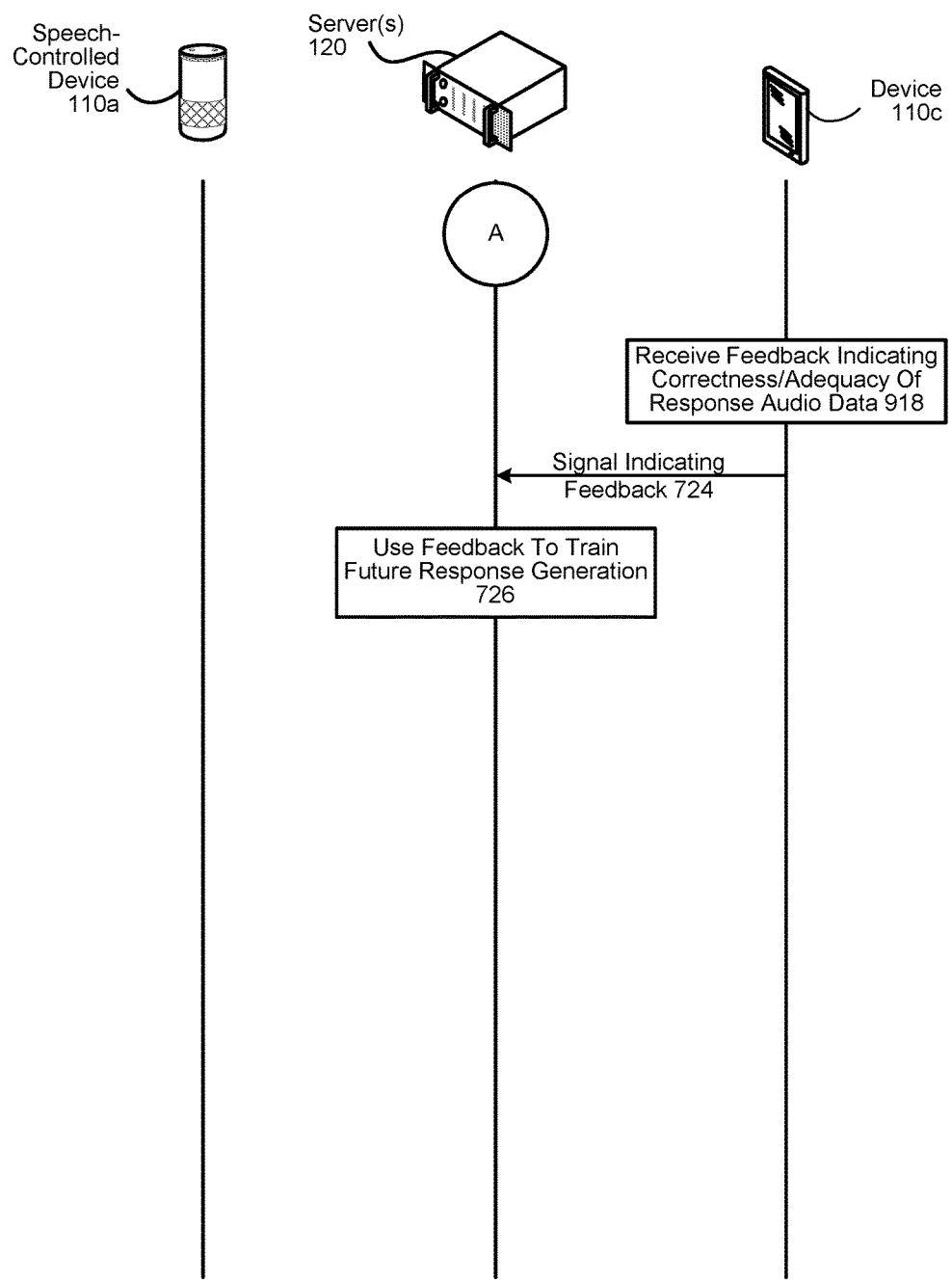

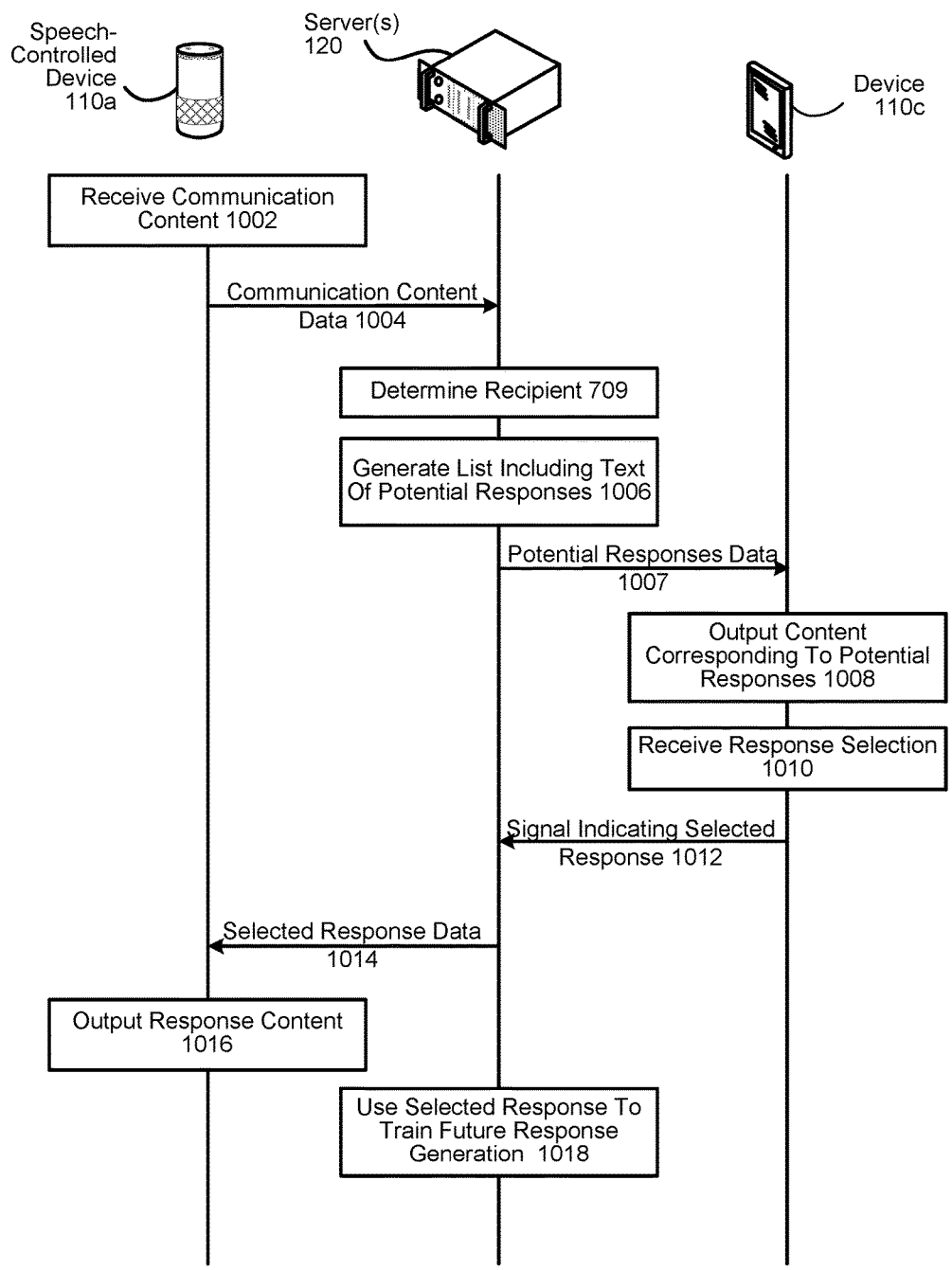

GENERATION OF AUTOMATED MESSAGE RESPONSES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A and 5B illustrate speech synthesis using unit selection according to one aspect of the present disclosure.

FIGS. 9A and 9B are a signal flow diagram illustrating the generation of an audio message response and the recipient of feedback according to embodiments of the present disclosure.

FIG. 10 is a signal flow diagram illustrating the generation of multiple communication responses and the receipt of feedback according to embodiments of the present disclosure.

DETAILED DESCRIPTION

Figure 1:
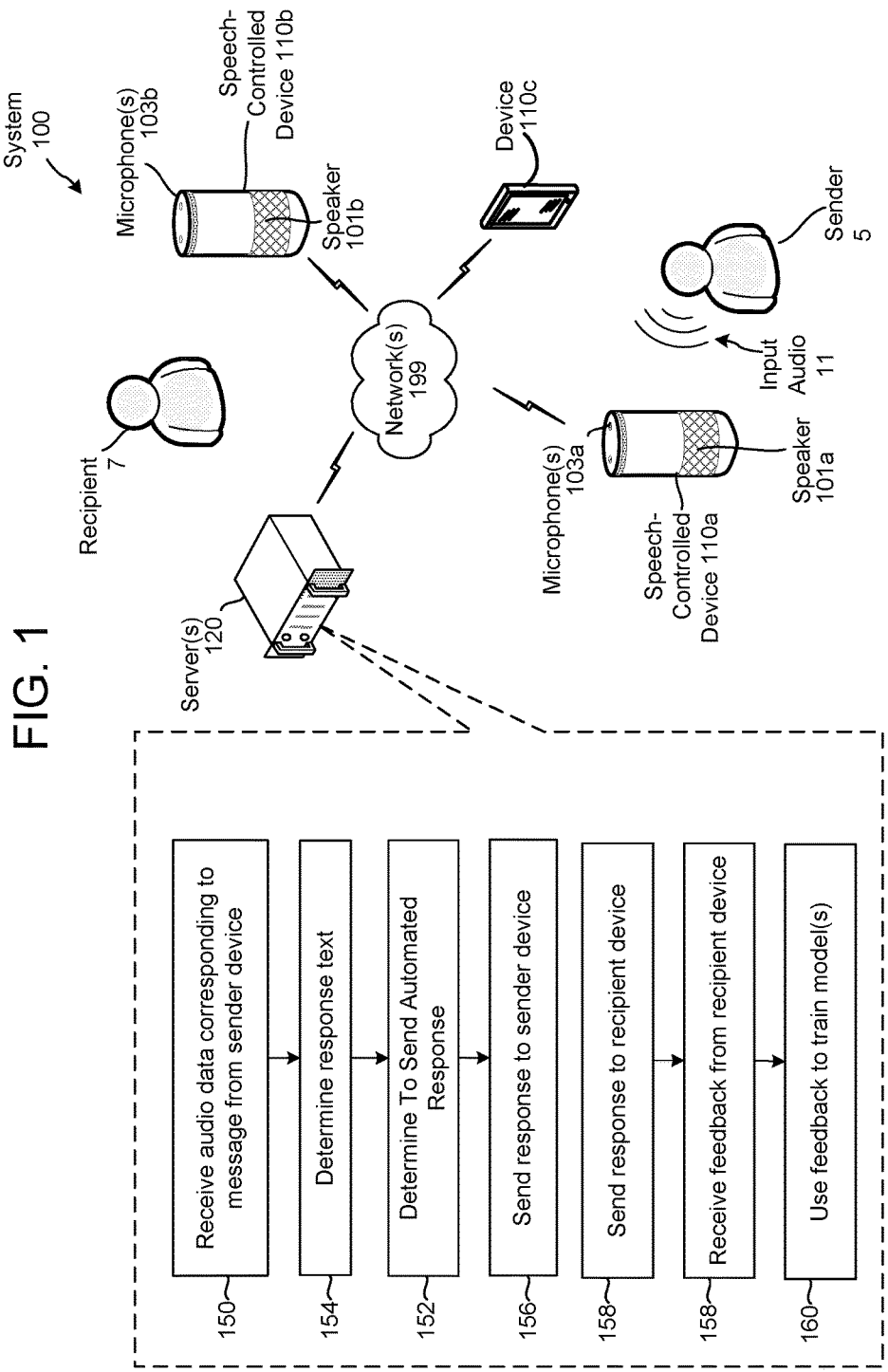
FIG. 1 illustrates a system for generating message responses and receiving feedback according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR, and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal. The audio signal may then be sent to a downstream remote device for further processing, such as converting the audio signal into an ultimate command. The command may then be executed by a combination of remote and local devices depending on the command itself.

In certain configurations, a speech processing system may be configured to communicate spoken messages between devices. That is, a first device may capture an utterance commanding the system to send a message to a recipient associated with a second device. In response, the user of the second device may speak an utterance that is captured by the second device, and then sent to the system for processing to send a message back to the user of the first device. In this manner a speech controlled system may facilitate spoken messaging between devices.

To enhance a user experience when interacting with a variety of devices, it is desirable to reduce the amount of user interaction needed to perform many different tasks and to "automate" such tasks, that is perform them with a reduced level of user involvement. One such task in the context of message exchanging is the task of automatically generating a response and sending the response when a user is unavailable or does not wish to receive incoming messages. For a speech-controlled system, having a user control what responses are sent at what times can be a complex task. To improve the generation and transmission of such messages a system may incorporate machine learning techniques along with user preferences to determine what response text should be associated with certain circumstances when automated responses should be sent. For example, machine learning techniques may be used to determine what types of responses a user says to different caller when the user is busy. The user being busy may be determined from calls that last less than a predetermined period of time (e.g., words spoken during a call that lasts a minute or less may be used by the machine learning component(s) of the system to determine how the user talks to a particular caller when busy). When the user is busy and unable to answer the caller, the system 100 may use similar language to that previously determined and/or associated town to response to the caller. In an example, whenever a user's spouse calls, the user may routinely be nice in telling their spouse they are busy when, in fact, the user is able to answer the call. The user may end these calls with their spouse by stating "love you." In contrast, when an unknown caller calls, the user may routinely end the call with "sorry but . . . " in a more negative tone than that spoken to the spouse. Various other configurations and system implementations are possible. Further, automated responses may be processed using text-to-speech techniques so that the responses may be sent in audio form. Text-to-speech (TTS) is a field concerning transforming textual data into audio data that is synthesized to resemble human speech. In certain circumstances, TTS may be used to mimic a recipient's voice to make an automated response sound as if it is coming from the recipient.

The present disclosure provides systems, methods, and devices for computer-generating responses to communications and sending the responses when the recipient of the communication is unavailable to generate and send a response. For example, an individual may send a message (either audio or text) to a recipient. The recipient may be unavailable to contemporaneously respond to the message (e.g., the recipient may be performing an action that makes it difficult or impractical for the recipient to contemporaneously respond to the audio message). For example, the recipient of the message may be watching a movie or television show when the message is sent. When the recipient is unavailable, the present system generates a response to the message and sends the response without receiving an instruction from the recipient to do so. In an example, the system sends the response to the original sender's device. Thereafter the system may send the content of the response to the recipient to receive feedback regarding the correctness of the response. In another example, the system may first send the response content to the recipient to receive the recipient's approval before sending the response to the original sender's device.

The system 100 may distinguish system generated and sent responses from user generated and sent responses in message strings displayed on the user's and/or recipient's device. For example, if the system 100 sends a message on the user's behalf, it may be displayed in a different first color, shade, etc. in a messaging application than messages sent by the user (e.g., messages the user both typed and sent).

The system generated responses may include various levels of detail depending on implementation. In one example, the system generated message may state "[User] is unavailable to respond." In another example, the system generated message may include more information, such as "Hi, I'm [User]'s virtual assistant. [User]'s unavailable for at least the next [time frame (e.g., determined from calendar application associated with user profile)], but I will let [User] know I sent this message when he is available."

FIG. 1 shows a system 100 configured to generate message responses. Although FIG. 1, and lower figures/discussion, illustrate the operation of the system 100 in a particular order, the steps described may be performed in a different order (as well as certain steps removed or added) without departing from the intent of the disclosure. As shown in FIG. 1, the system 100 may include one or more devices 110 local to a message sender 5 and message recipient 7, as well as one or more networks 199 and one or more servers 120 connected to device(s) 110 across network(s) 199. The server(s) 120 (which may be one or more different physical devices) may be capable of performing traditional speech processing (such as ASR, NLU, query parsing, etc.) as described herein. A single server 120 may be capable of performing all speech processing or multiple servers 120 may combine to perform the speech processing. Further, the server(s) 120 may be configured to execute certain commands, such as answering queries spoken by the sender 5 and/or recipient 7. In addition, certain speech detection or command execution functions may be performed by the device 110.

As shown in FIG. 1, the message sender 5 may speak message input audio 11, with the input audio being captured by a microphone 103a of a speech-controlled device 110a of the message sender 5, or a microphone array (not illustrated) separated from but associated with the device 110a. The server 102 receives (150) audio data corresponding to the message input audio 11 from the device 110a. If the input message audio 11 is captured by a microphone array that is connected to the device 110a, the microphone array may send audio data corresponding to the input message audio 11 to the device 110a, which sends the audio data to the server 120. Alternatively, if the input audio 11 is captured by a microphone array connected to a companion application of a mobile computing device, such as a smart phone, tablet, etc., audio data corresponding to the input audio 11 via the companion application to the device 110a and/or server 120.

The server 120 then determines (154) text content for the response. The server 120 may use a trained model to analyze contextual information (e.g., the caller identity, time of day, calendar data, activity data, etc.) to determine the text of the automated message. The server 120 may generate a single response to the message, or may generate more than one possible response to the message. If multiple possible responses are generated, the server 120 may select the generated response having the highest/greatest confidence score. Further, the system may send the multiple possible responses to a device associated with the recipient 7 for disambiguation/selection by the recipient 7 prior to sending a response message using the selected automated response.

The server 120 determines (152) whether to send a response to the message. Such a determination may involve, for example, determining whether the recipient 7 is unavailable (e.g., whether the recipient 7 is performing an action that makes it difficult or impractical for the recipient 7 to contemporaneously respond to the message). The recipient 7 may have a user profile that indicates various devices of the recipient 7. Whether to send a response may be based on a variety of contexts. In one example, the user profile may include indicators associated with devices in the user profile. The indicators may represent a user of the device as being unavailable to respond. The indicators (e.g., "unavailable indicators") may be time-based and/or dynamic based on what other devices/applications associated with the user profile feed to a context engine. For example, a calendar application can be used to generate the unavailable indicator, which may stay associated with the respective device in the user profile until the calendar application shows availability. In another example, a device's global positioning system (GPS) indicating the device as being located at a movie theater (or other location whether speech is disfavored) may cause the context engine to associate an unavailability indicator with the device located at the movie theater. In a further example, a device being presently used, such as a tablet or set-top box to stream media, may be used to set the unavailability indicator. Any of these examples may also require some form of confirmation that the user is actually by the streaming device. Such confirmation may be provided via voice detection, computer vision facial recognition, etc. Other illustrative contexts for determining whether to send a response include, for example, passed message exchange content between the sender 5 and the recipient 7, content of the input message audio 11, the identity of the message sender 5, a time of day when the input message audio 11 is sent, the weather of a location of the recipient 7 (e.g., the recipient 7 may be less likely to respond to the message if the weather is sunny because the recipient 7 may be outside), a do not disturb setting of one or more devices of the recipient 7 is activated, idle time since a last communication of the recipient 7, and proximity of the recipient 7 to a recipient 7 device (e.g., the recipient 7 may be unlikely to respond if the recipient 7 is proximate to a device located in the recipient's vehicle). The unavailability determination may include the determination of a confidence score indicating a likelihood that the recipient 7 is in-fact unavailable. The system 100 may use a trained model to analyze contextual information to determine a confidence that any incoming messages should be answered with an automated message. The system 100 may set a threshold that the determined confidence score must meet or exceed in order for the recipient 7 to be determined unavailable for purposes of sending such an automated message.

The server 120 sends (156) the response to the sender device 110*a*, which outputs content of the response to the sender 5 in a visual and/or audible format. A format of the response sent to the sender device 110*a* may depend upon the format of the originally received message. For example, if the sender 5 speaks an audio message to the device 110*a*, the server 120 may generate an audio response. For further example, if the sender 5 types a text message, the server 120 may generate a text response. As indicated below, an audio response may be generated using TTS processing, and may even use TTS processing to make the audio response sound as if it is being spoken by the recipient 7.

The server 120 may also send (158) the generated response to a recipient 7 device. For example, when the server 120 determines the recipient 7 is unavailable based on a device of the recipient 7 outputting multimedia content, the response may be sent to a device 110*c* (e.g., a smart phone, tablet, etc.) of the recipient 7. The device 110*c* may display content of the response as well as virtual buttons that allow the recipient 7 to provide feedback to the system 100 indicating the correctness of the generated response. By displaying the response content via the device 110*c* when multimedia content is being output via a separate device (e.g., smart television) of the recipient 7, the system 100 enables the recipient 7 to provide correctness feedback of the response without needing to pause the multimedia content or without having the recipient 7 be disruptive to other individuals that are observing the multimedia content.

In the example where the server 120 determines the recipient 7 is unavailable based on a device of the recipient 7 outputting multimedia content, the server 120 may also or alternatively cause the device outputting the multimedia content to visually display (e.g., via a popup window) content of the response or an indication of the response. In this situation, the recipient 7 may choose to pause output of the multimedia content and audibly indicate the correctness of the generated response. Spoken audio indicating the response's correctness may be may be captured by a microphone 103*b* of a speech-controlled device 110*b* of the recipient 7. Alternatively, the spoken audio may be captured by a microphone array (not illustrated) separated from but associated with the device 110*b* of the recipient 7. In this example, where the server 120 causes the device outputting the multimedia content to also display (e.g., via a popup window) content of the response or an indication of the response, instead of responding audibly, the recipient 7 may alternatively choose to provide feedback via the device 110*c* as described above.

As illustrated, the server 120 may send the response to the sender device 110*a* prior to sending the response to the recipient device 110*c*. For example, the server 120 may send the response to the recipient device 110*c* at a later time so that the recipient 7 may provide feedback to the system 100 at a time when the recipient 7 is not busy. Alternatively, the server 120 may send the response—for purposes of receiving feedback as described above—to the recipient device 110*c* prior to sending the response to the sender device 110*a* so that the recipient 7 may determine that the automated response content is correct prior to sending. If a single response is generated by the server 120, this approach allows the recipient 7 to indicate correctness of the response prior to the response being sent to the sender device 110*a*. If the recipient indicates the response has a low correctness or is incorrect, this approach provides the server 120 with an opportunity to generate a second response that is more correct. Alternatively, if the recipient indicates the response has a low correctness or is incorrect, this approach provides the recipient 7 with an opportunity to provide the server 120 with a correct response, via spoken audio or text. If the server 120 generates a list of responses, this approach allows the recipient 7 to select the most correct generated response.

The server 120 may then receive (158) the correctness feedback from the recipient device (i.e., the speech-controlled device 110*b* if the recipient 7 speaks the feedback, the device 110*c* if the recipient 7 types the feedback or indicates the feedback via a virtual button, etc.). The server 120 uses (160) the received feedback to train future generation of responses. For example, the feedback from the recipient may be used by the server 120 to train/re-train machine learning models, such as a model used to determine (152) whether to generate a response to an incoming message or a model used to determine (154) the message content.

Figure 2:
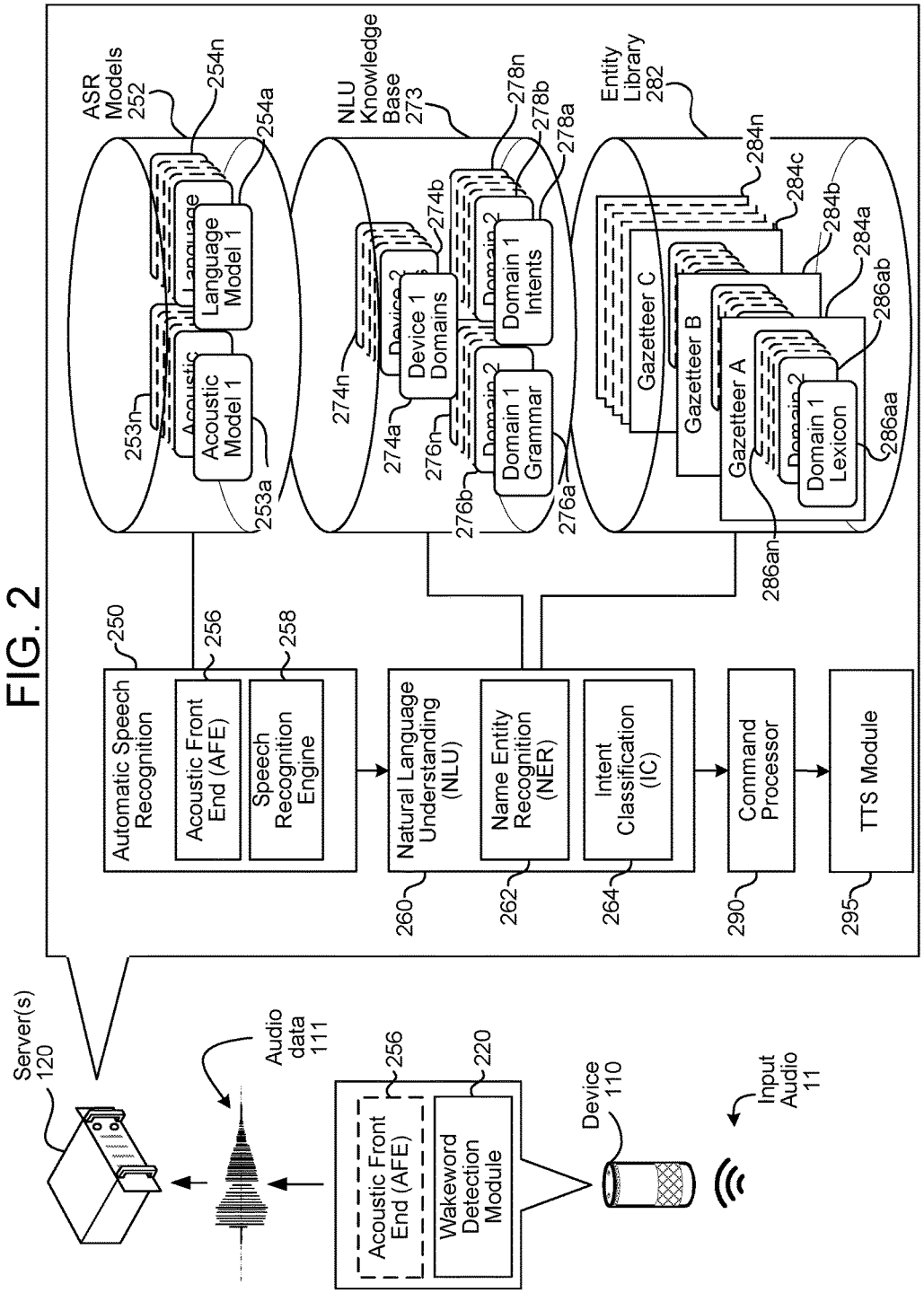
FIG. 2 is a conceptual diagram of how a spoken utterance may be processed according to embodiments of the present disclosure.

Further details of generating text-to-speech output in response to receiving a communication are explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone 103 of device 110, captures audio 11 corresponding to a spoken utterance. The device sends audio data 111 corresponding to the utterance, to an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

An ASR process 250 converts the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes)

and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine 258. The speech recognition engine 258 compares the speech recognition data with acoustic models 253, language models 254, and other data models and information for recognizing the speech conveyed in the audio data. The AFE 256 may reduce noise in the audio data and divide the digitized audio data into frames representing time intervals for which the AFE 256 determines a number of values, called features, representing the qualities of the audio data, along with a set of those values, called a feature vector or audio feature vector, representing the features/qualities of the audio data within the frame. Many different features may be determined, as known in the art, and each feature represents some quality of the audio that may be useful for ASR processing. A number of approaches may be used by the AFE 256 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing 260 may include a named entity recognition (NER) module 252, intent classification (IC) module 264, NLU storage 273 and a and knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's storage 273). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a command to send a message, the destination command processor 290 may include a messaging processor, such as one located on a messaging server, configured to determine a message recipient, determine a message output format, which may include causing the message text to be processed by a TTS module 295 and output from a recipient device as synthesized speech.

Figure 3:
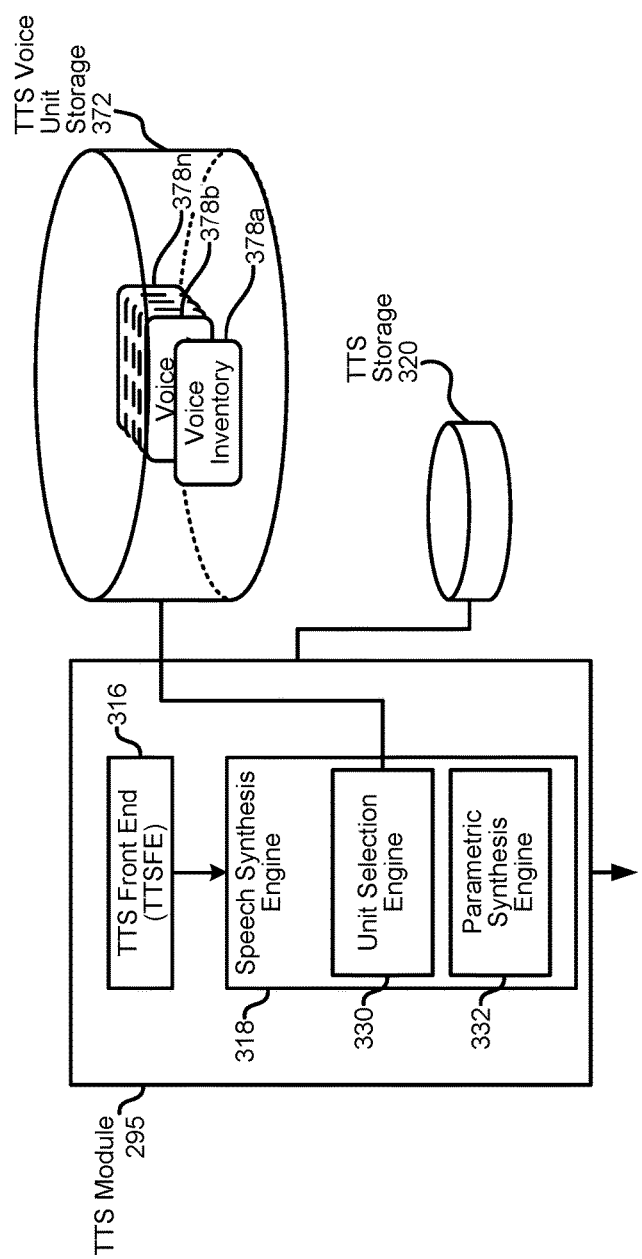
FIG. 3 is a conceptual diagram of how speech quality may be determined and used for generating individualized text-to-speech output according to embodiments of the present disclosure.

As shown in FIG. 3, TTS module/processor 295 may include a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS module 295 that indicate how specific words should be pronounced (e.g., an indication that a word is an interjection). The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory of the server 120, device 110, or other device, for example. Similarly, the instructions for operating the TTSFE 316 and speech synthesis engine 318 may be located within the TTS module 314, within the memory and/or storage of the server 120, device 110, or within an external device.

Text input into a TTS module 295 may be sent to the TTSFE 316 for processing. The front-end may include modules for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS module 295 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS module 295 to craft a natural sounding audio waveform output. The language dictionary may also include letter-to-sound rules and other tools that may be used to pronounce previously unidentified words or letter combinations that may be encountered by the TTS module 295. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS module 295. Such acoustic features may include pitch, energy, duration, and the like. Application of acoustic features may be based on prosodic models available to the TTS module 295. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 295 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Figure 4:
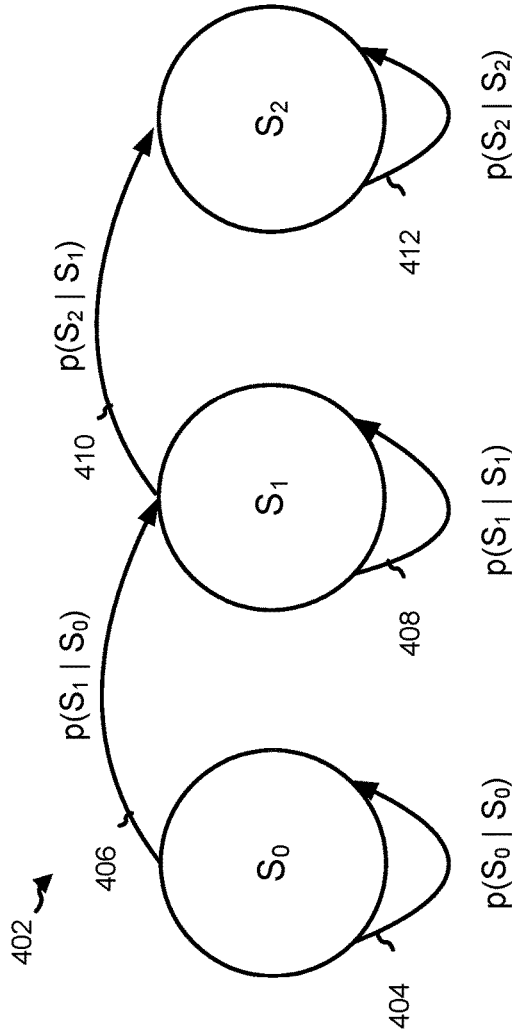
FIG. 4 illustrates speech synthesis using a Hidden Markov Model to perform text-to-speech (TTS) processing according to one aspect of the present disclosure.

An example of HMM processing for speech synthesis is shown in FIG. 4. A sample input phonetic unit, for example, phoneme /E/, may be processed by a parametric synthesis engine 332. The parametric synthesis engine 332 may initially assign a probability that the proper audio output associated with that phoneme is represented by state $S_0$ in the Hidden Markov Model illustrated in FIG. 4. After further processing, the speech synthesis engine 318 determines whether the state should either remain the same, or change to a new state. For example, whether the state should remain the same 404 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent phonetic units, the speech synthesis engine 318 similarly determines whether the state should remain at $S_1$, using the transition probability represented by $P(S_1|S_1)$ 408, or move to the next state, using the transition probability $P(S_2|S_1)$ 410. As the processing continues, the parametric synthesis engine 332 continues calculating such probabilities including the probability 412 of remaining in state $S_2$ or the probability of moving from a state of illustrated phoneme /E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 320. Techniques such as maximum likelihood estimation (MLE) may be used to estimate the probability of particular states.

In addition to calculating potential states for one audio waveform as a potential match to a phonetic unit, the parametric synthesis engine 332 may also calculate potential states for other potential audio outputs (such as various ways of pronouncing phoneme /E/) as potential acoustic matches for the phonetic unit. In this manner multiple states and state transition probabilities may be calculated.

The probable states and probable state transitions calculated by the parametric synthesis engine 332 may lead to a number of potential audio output sequences. Based on the acoustic model and other potential models, the potential audio output sequences may be scored according to a confidence level of the parametric synthesis engine 332. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320 or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output. An example of how unit selection is performed is illustrated in FIGS. 5A and 5B.

For example, as shown in FIG. 5A, a target sequence of phonetic units 502 to synthesize the word "hello" is determined by a TTS device. As illustrated, the phonetic units 502 are individual phonemes, though other units, such as diphones, etc. may be used. A number of candidate units 504 may be stored in the voice corpus. Although phonemes are illustrated in FIG. 5A, other phonetic units, such as diphones, may be selected and used for unit selection speech synthesis. For each phonetic unit there are a number of potential candidate units (represented by columns 506, 508, 510, 512 and 514) available. Each candidate unit represents a particular recording of the phonetic unit with a particular associated set of acoustic and linguistic features. The TTS system then creates a graph of potential sequences of candidate units to synthesize the available speech. The size of this graph may be variable based on certain device settings. An example of this graph is shown in FIG. 5B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. The candidate units along the selected path through the graph may then be combined together to form an output audio waveform representing the speech of the input text. For example, in FIG. 5B the selected path is represented by the solid line. Thus units $\#_2$, $H_1$, $E_4$, $L_3$, $O_3$, and $\#_4$ may be selected, and their respective audio concatenated, to synthesize audio for the word "hello."

Audio waveforms including the speech output from the TTS module 295 may be sent to an audio output component, such as a speaker for playback to a user or may be sent for transmission to another device, such as another server 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS module 295 may be configured to perform TTS processing in multiple languages. For each language, the TTS module 295 may include specially configured data, instructions and/or components to synthesize speech in the desired language(s). To improve performance, the TTS module 295 may revise/update the contents of the TTS storage 320 based on feedback of the results of TTS processing, thus enabling the TTS module 295 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice inventories 378a-378n, where each unit database is configured with a different "voice" to match desired speech qualities. The voice selected by the TTS module 295 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system. The system may also capture and process command utterances of the user and use those utterances and their corresponding audio data to build a TTS voice corpus. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventories 378 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile and used for speech synthesis when the specific speech quality is desired. Customized voices may be created based on multiple desired speech qualities combined (for both unit selection or parametric synthesis). For example, one voice may be "shouted" while another voice may be "shouted and emphasized." Many such combinations are possible.

As an alternative to customized voice corpuses or customized parametric "voices," one or more filters may be used to alter traditional TTS output to match the desired one or more speech qualities. For example, a TTS module 295 may synthesize speech as normal, but the system (either as part of the TTS module 295 or otherwise) may apply a filter to make the synthesized speech sound take on the desired speech quality. In this manner a traditional TTS output may be altered to take on the desired speech quality.

Figure 6:
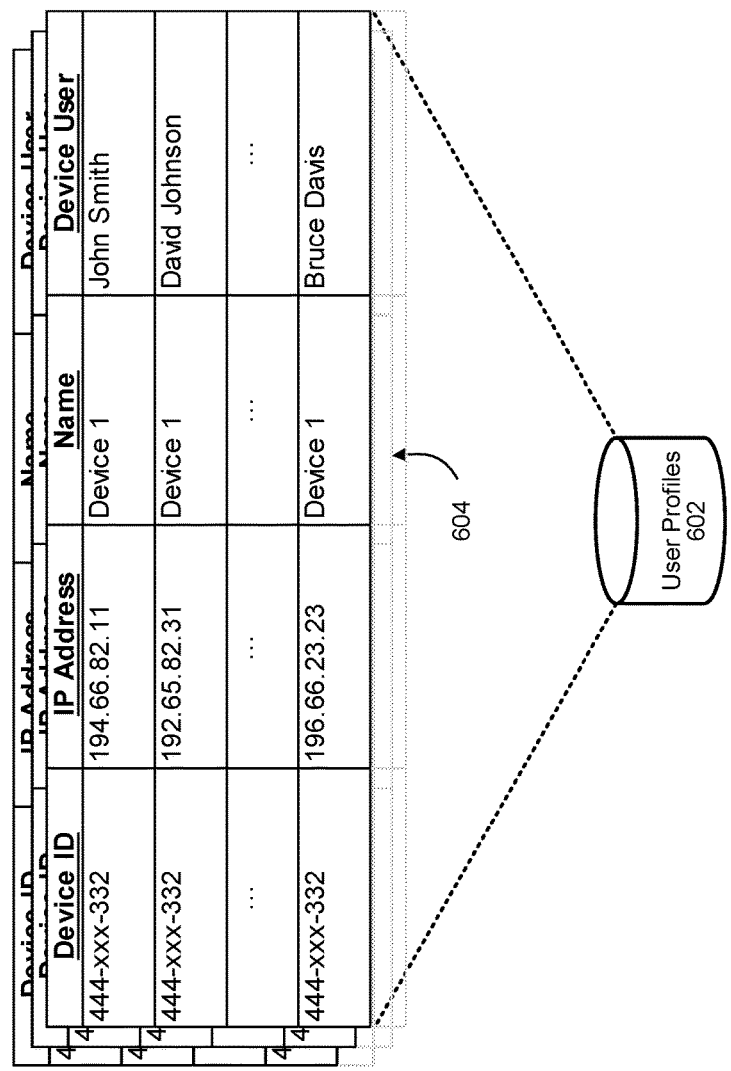
FIG. 6 illustrates data stored and associated with user profiles according to embodiments of the present disclosure.

FIG. 6 illustrates a user profile storage 602 that includes data regarding user profiles 604 as described herein. The user profile storage 602 may be located proximate to the server 120, or may otherwise be in communication with various components, for example over the network 199. The user profile storage 602 may include a variety of information related to individual users, accounts, etc. that interact with the system 100. For example, each user account may include information that identifies devices of the user. Such device identifying information may include a device ID, an IP address, and a name of the device.

A user profile 604 may also include (or be associated with) TTS data, such as a customized voice corpus including pre-stored speech units that may be used to perform TTS operations in order to create synthesized speech that sounds as if it is spoken by a user associated with the user profile. The user profile 604 may also include (or be associated with) data used to perform parametric synthesis to create synthesized speech that sounds as if it is spoken by a user associated with the user profile.

The user profile 604 may also include preferences regarding which message senders/callers trigger the generation of automated responses, when automated responses should be generated for a particular user, etc.

Figure 7:
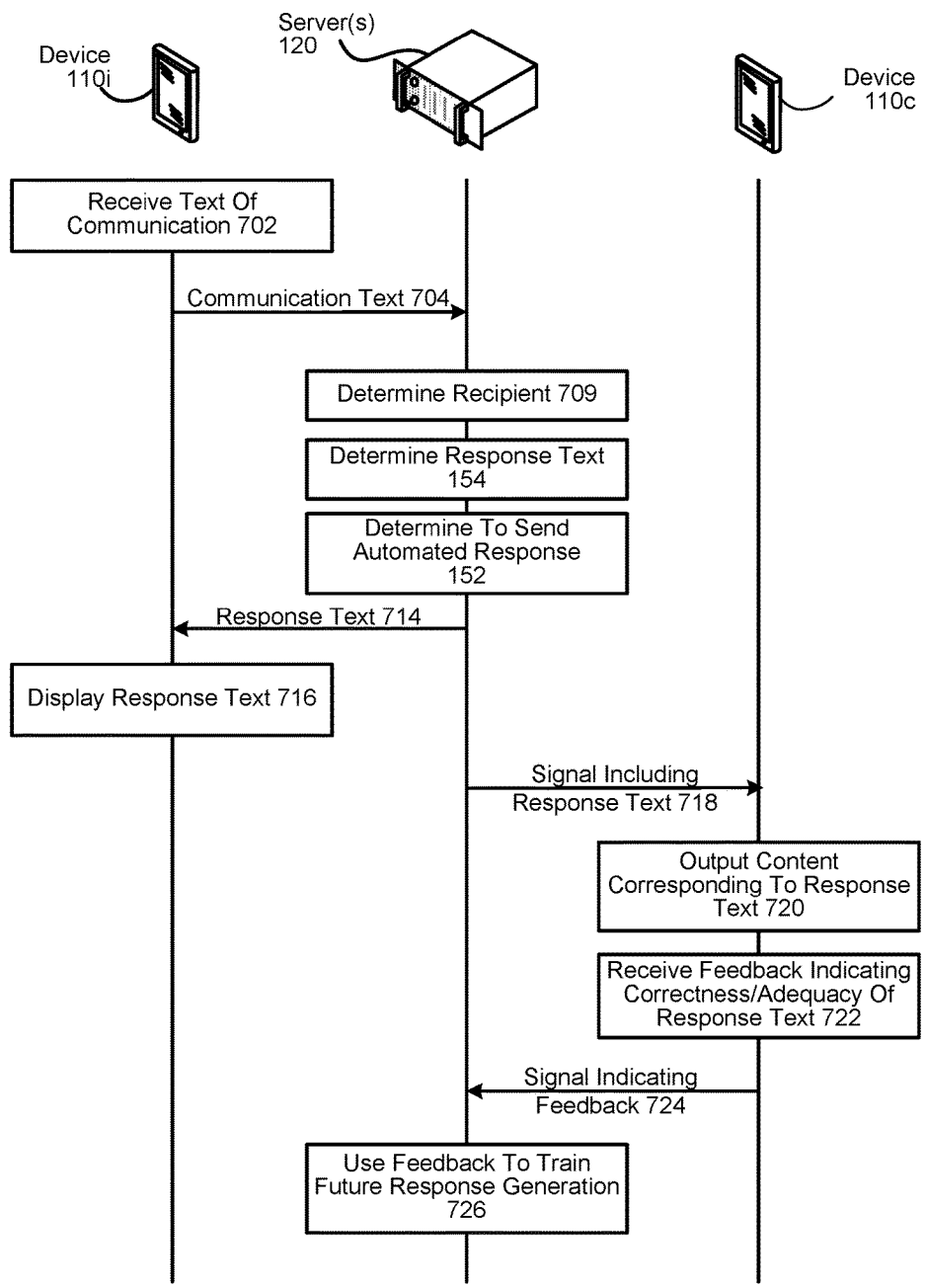
FIG. 7 is a signal flow diagram illustrating the generation of a text message response and the receipt of feedback according to embodiments of the present disclosure.

FIG. 7 illustrates the generation of a text message response and the receipt of feedback according to embodiments of the present disclosure. A device 110i receives (702) text of a text message. The text may be received via a keyboard integrated within the device 110i, displayed on a touch interface of the device 110i, or separated from but associated with (e.g., via hardwire, wireless, Bluetooth, etc.) the device 110i. The device 110i sends (704) the text message text to the server 120.

The server 120 may determine (709) a recipient of the text message, for example by analyzing a recipient field of the text message. The server 120 may also determine (154) text responsive to the text communication/message. A single text response may be generated, or multiple possible text responses may be generated. If multiple possible text responses are generated, the server 120 may respond to the text message with the generated response having the highest/greatest confidence score.

The system may employ a first machine learning model to determine (154) the text of an automated response. The first model may consider a variety of input data. The first model may be specific to the recipient of the message or may be used for multiple users. The first model may be trained using a multitude of training examples where each example includes values for the different data of the example as well as a ground truth as to what automated response message text is appropriate for that particular example. The first model may be trained using a large text corpus taken from responses to communications (whether automated or not) that may be converted into training examples (and encoded) to train the model how to respond to incoming messages under different circumstances.

The server 120 may also determine (152) whether to send the automated response text to the sender device 110i. This may be done by determining the recipient is unavailable, determining the recipient is busy, determining the message is arriving at a time when the user should not to be disturbed (e.g., 3 a.m.), determining the recipient has not responded to the message within a certain amount of time after receiving the message (e.g., the system may output a notification stating it will respond to the message if the user does not respond in N amount of time), etc. Determining that the recipient is unavailable (i.e., that an automated response should be sent) may be based on, for example, a device associated with the recipient's user profile outputting multimedia content (e.g., a television being in operation) when the message is received, a calendar application indicating the recipient is presently busy, previous message exchange content between the sender and the recipient, content of the incoming message, the identity of the message sender, a time of day when the input message text is sent, the weather of a location of the recipient (e.g., the recipient may be less likely to respond to the message if the weather is sunny because the recipient may be outside), a do not disturb setting of one or more devices of the recipient being activated, idle time since a last communication of the recipient, and proximity of the recipient to a recipient device (e.g., the recipient may be unlikely to respond if the recipient is proximate to a device located in the recipient's vehicle).

As can be appreciated, many different factors may go into whether the system should send an automated response. To improve consideration of these many factors, the system may employ a second machine learning model to determine (152) whether to send an automated response. The second model may be used, for example, to determine a confidence score indicating a likelihood that an automated response should be sent. The server 120 may set a threshold that the determined confidence score must meet or exceed in order for the automated response to be sent. The second model may consider a variety of input contextual data such as a device associated with a user profile of the recipient outputting multimedia content, a calendar application indicating the recipient is presently busy, passed message exchange content, content of the input audio data, an identity of a sender of the message, a time of day, a do not disturb setting of one or more devices of the recipient is activated, or idle time since a last communication of the recipient. The second model may be specific to the recipient of the message or may be used for multiple users. The second model may be trained using a multitude of training examples where each example includes values for the different data of the example as well as a ground truth as to whether the particular example should result in an automated response or not.

In an example, an encoder/decoder model may be used. The encoder may convert contextual information and information regarding passed exchanges of users into representations. In addition, a state of a thread between users may be encoded into a representation. The representations may be sent to the decoder, which generates words of a response. If a user chooses a particular response to be sent as detailed herein, that response is indicated as a "ground truth" for the decoder at that point in time. This makes the decoder produce the same words that were chosen by the user.

The server 120 may then send (714) the text response to the device 110i of the sender, which displays (716) the response text.

While the first model to determine (154) the automated response text to send an automated response and the second model to determine (152) to send the automated response may be different models, they may be combined into a single model that outputs a decision as to what the response should be and whether to send the automated response.

Figure 8:
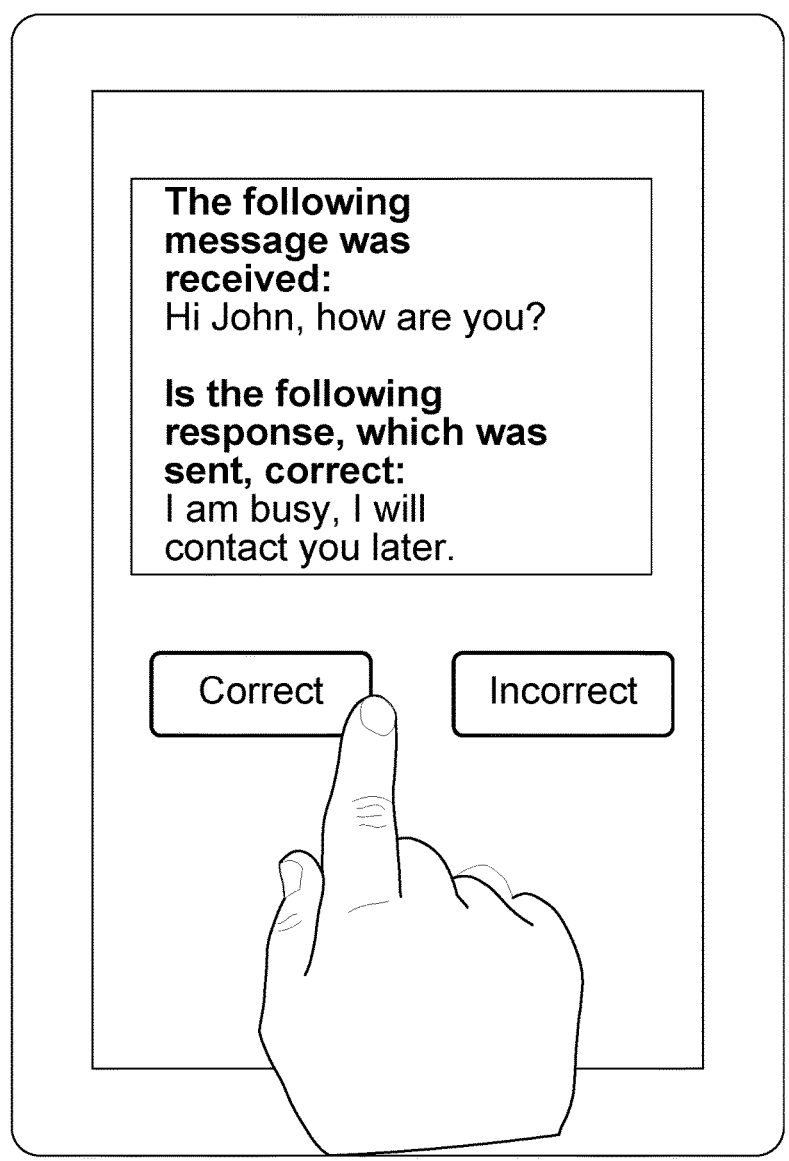
FIG. 8 illustrates a recipient device indicating content of a system generated response.

After determining the response text, the server 120 may send (718) a signal indicating the response text to a device 110c of the message recipient. The device 110c outputs (720) content corresponding to the response text. An illustrative example of the output of the response text by the device 110c is illustrated in FIG. 8. The device 110c receives (722) feedback indicating the correctness/adequacy of the system generated response, and sends (724) a signal indicating the feedback to the server 120. The server 120 uses (726) the feedback to train future response generation. For example, the server 120 may collect incoming messages, the data surrounding the context of those messages, the selected response text, and the user feedback to update and retrain the first model or the second model. The system may also aggregate the feedback of multiple users and use the feedback to update models for different users as well.

The system may also be configured to generate automated responses to respond to incoming spoken messages. FIGS. 9A and 9B illustrate the generation of an audio message response. A speech-controlled device 110a of a message sender receives (902) spoken audio, converts the spoken audio into audio data, and sends (904) the audio data to the server 120. The user that spoke an utterance in the audio data may be determined based on speaker ID (i.e., voice fingerprinting), representation of the user in an image captured by the speech-controlled device 110a, verification of the user's fingerprint via a fingerprint sensor (either located on or separate from the speech-controlled device 110a), device ID linked to a user account (e.g., a smart watch), etc. The server 120 performs (906) ASR on the audio data to create text and performs (907) NLU on the text. Using the NLU results, the server 120 may determine (709) a recipient of the text message. The server 120 also generates (154) text of a response. A single text response may be generated, or multiple possible text responses may be generated. The text(s) may be generated using a first trained model, as explained above, and/or may also consider the various factors described above in reference to FIG. 7. The server 120 may then generate (908) response audio data based on and for each of the generated response text. Generation of the response audio data may include TTS processing which may be configured to sound as if the response audio data is being spoken by the intended recipient. For example, the system may identify stored audio segments corresponding to previous speech of the recipient, and perform unit selection using the stored audio segments. The audio data may be generated using the response text having the highest/greatest confidence score.

The server 120 also determines (152) whether to send the automated response audio. Determination of whether to send the automated response may use a second trained model, as explained above, and/or may also consider the various factors described above in reference to FIG. 7. The server 120 sends (910) the selected response audio data to the caller's/sender's speech-controlled device 110a, which outputs (912) the response audio.

The server 120 may also send (914) a signal indicating content of the response audio data to the device 110c of the recipient. The device 110c outputs (916) content corresponding to the response audio. An illustrative example of the output of the response audio by the device 110c is illustrated in FIG. 8. The device 110c receives (918) feedback indicating the correctness/adequacy of the system generated response, and sends (724) a signal indicating the feedback to the server 120. The server 120 uses (726) the feedback to train future response generation.

Figure 11:
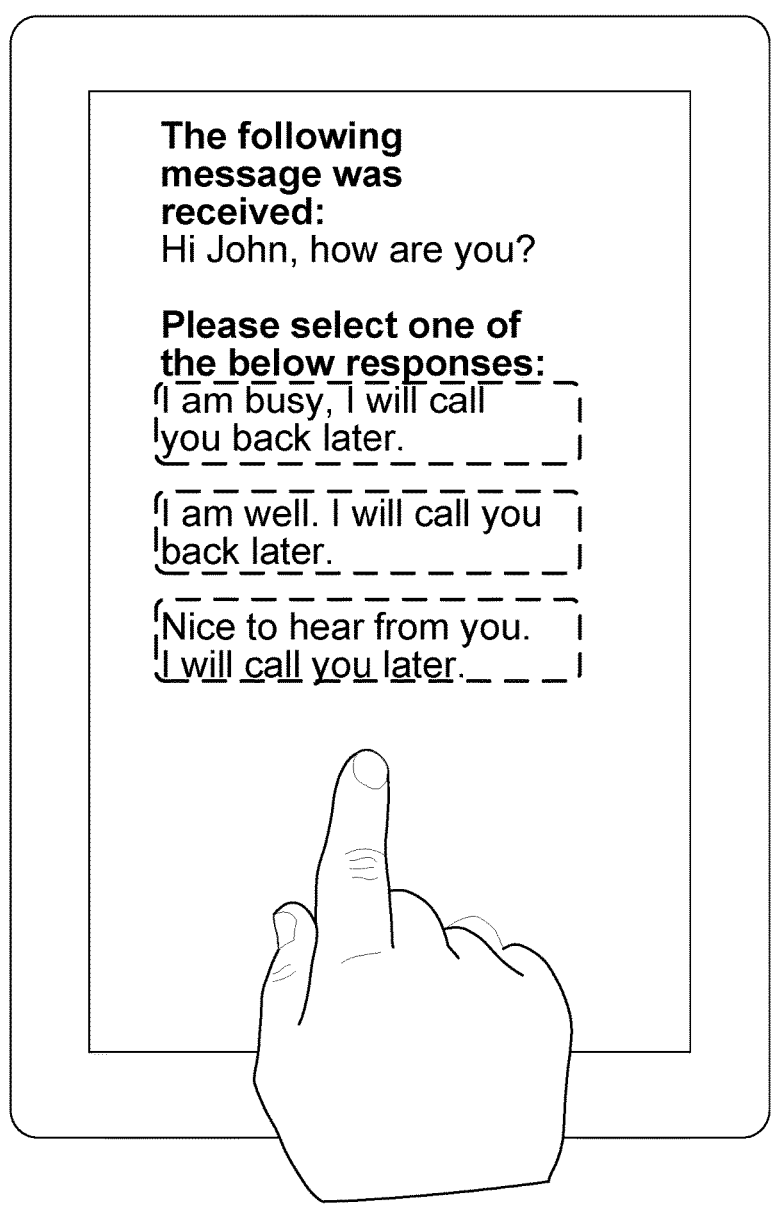
FIG. 11 illustrates a recipient device indicating content of system generated responses.

FIG. 10 illustrates the generation of multiple communication responses and the receipt of feedback from a communication recipient. A communication sender device, such as the speech-controlled device 110a, receives (1002) content of a communication and sends (1004) data corresponding to the communication content to the server 120. The server 120 determines (709) a recipient of the communication and generates (1006) text of various possible responses to the communication. The system may generate 1006 the multiple possible response text using the same trained second model as above with determining (154) what text to use for a response. The second model may output a top N-best list of potential responses, which may be used for the list of potential responses. The system may then send (1007) a message indicating the possible responses to a device 110c of the recipient. The device 110c outputs (1008) content corresponding to the various responses. An illustrative example of the output of the various responses by the device 110c is illustrated in FIG. 11. The device 110c receives (1010) a selection of one of the multiple responses, and sends (1012) a signal indicating the selection to the server 120. The server 120 sends (1014) data corresponding to the selected response to the communication initiator's speech-controlled device 110a, which outputs (1016) response content. The response content may include TTS generated content that may be configured to sound as if the response is being spoken by the intended recipient using techniques disclosed herein. The server 120 also uses (1018) the selected response feedback to train future response generation.

Figure 12:
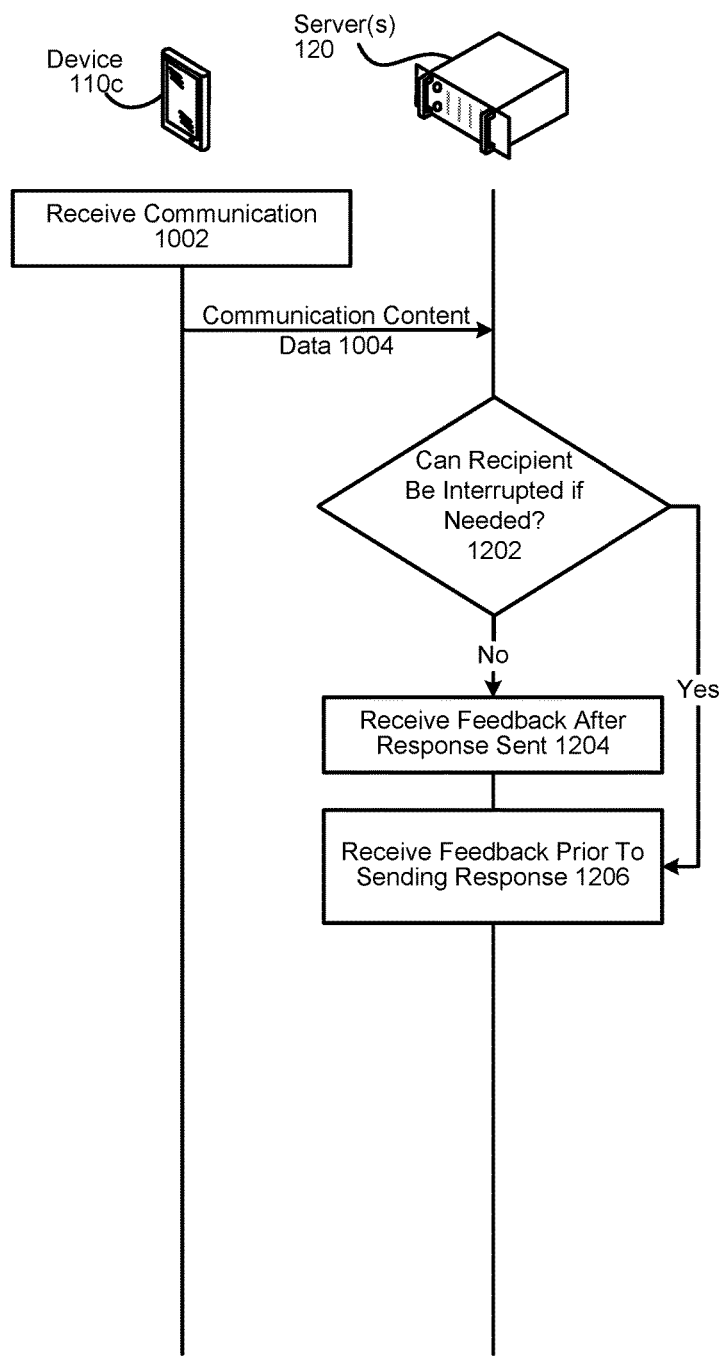
FIG. 12 is a signal flow diagram illustrating a determination of when to receive user feedback according to embodiments of the present disclosure.

FIG. 12 illustrates a determination of when to receive user feedback. A sender device, such as the speech-controlled device 110a, receives (1002) content of a communication and sends (1004) data corresponding to the communication content to the server 120. The server 120 determines (1202) whether the recipient can be interrupted if needed. For example, it may be determined that the recipient can be interrupted if unavailability is based on a device of the recipient outputting multimedia content. In another example, it may be determined that the recipient can be interrupted if unavailability is based on a calendar application indicating the recipient is presently in a meeting. In a further example, however, it may be determined that the recipient cannot be interrupted if unavailability is based on a calendar application indicating the recipient is presently on vacation. Many such examples are possible. If it is determined the recipient cannot be interrupted, the server 120 may generate and send a response, and thereafter receive (1204) feedback indicating the correctness of the sent response. Alternatively, if it is determined the recipient can be interrupted, the server 120 may receive (1206) feedback indicated the correctness of a generated response prior to sending the response.

Various machine learning techniques may be used to train and/or operate the machine learning models that may be used to determine whether to generate an automated message or to determine the text of the automated message. In machine learning techniques, an adaptive system is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. Being provided data with consistent patterns and recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

Example machine learning techniques include, for example neural networks, inference engines, trained classifiers, etc. Examples of trained classifiers include support vector machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers (either binary or multiple category classifiers) may issue a "score" indicating which category the data most closely matches. The score may provide an indicator of how closely the data matches the category. For example, in the present application, a support vector machine (SVM) may be trained/configured to process audio data, for example audio feature vectors, to determine if speech associated with the audio feature vectors was shouted/emphasized.

Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used to train the first and second models.

Figure 13:
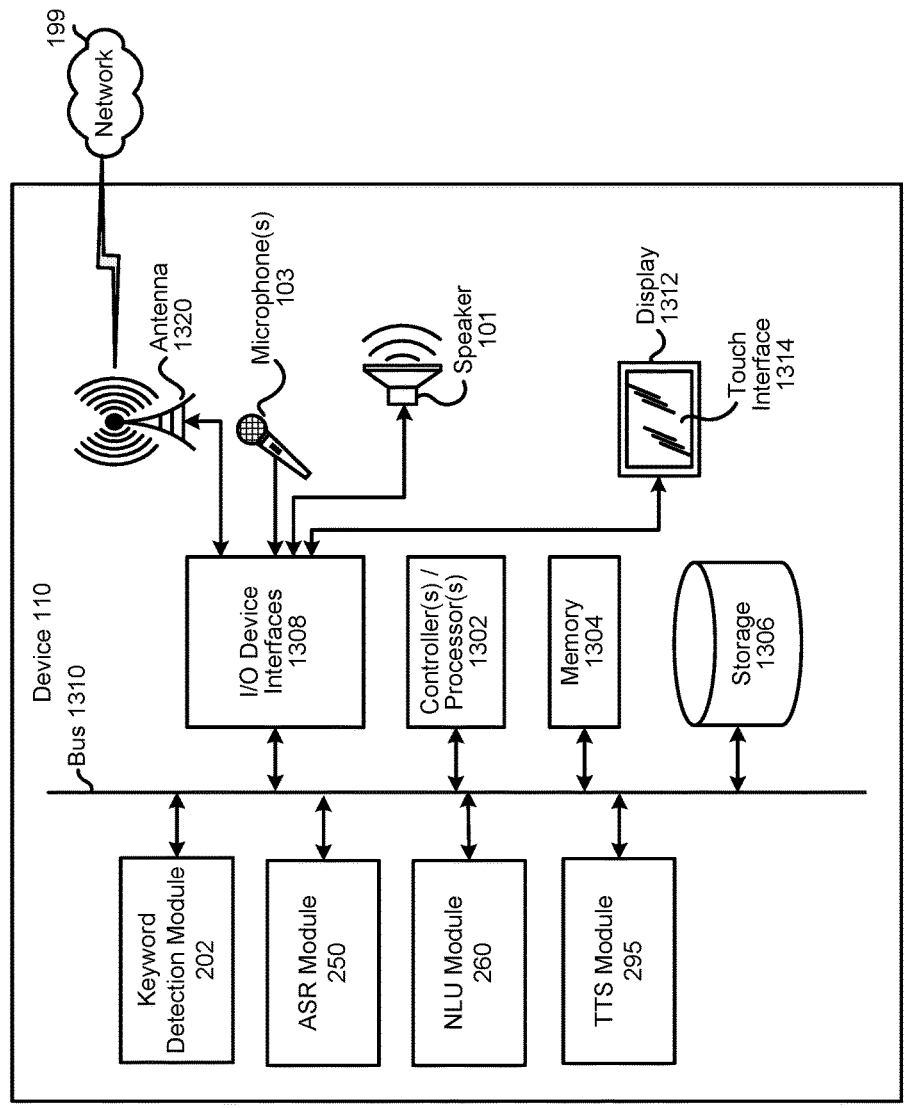
FIG. 13 is a block diagram conceptually illustrating example components of a device according to embodiments of the present disclosure.
Figure 14:
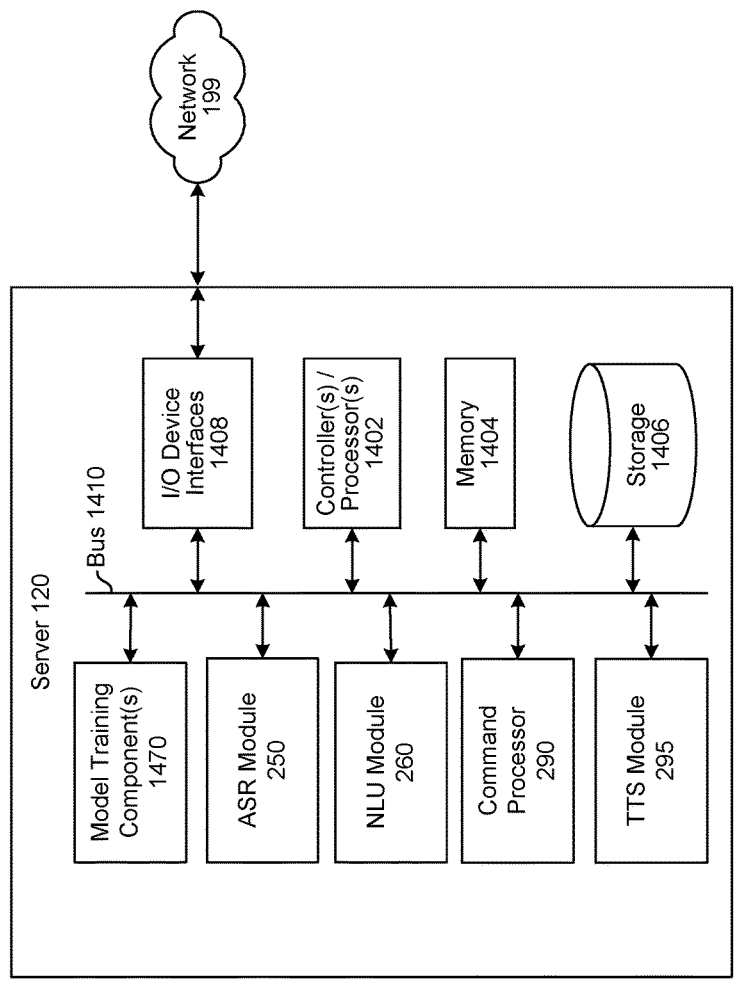
FIG. 14 is a block diagram conceptually illustrating example components of a server according to embodiments of the present disclosure.

FIG. 13 is a block diagram conceptually illustrating a local device 110 that may be used with the described system and may incorporate certain speech receiving/keyword spotting capabilities. FIG. 14 is a block diagram conceptually illustrating example components of a remote device, such as a remote server 120 that may assist with ASR, NLU processing, or command processing. Server 120 may also assist in determining similarity between ASR hypothesis results as described above. Multiple such servers 120 may be included in the system, such as one server 120 for ASR, one server 120 for NLU, etc. In operation, each of these devices may include computer-readable and computer-executable instructions that reside on the respective device (110/120), as will be discussed further below.

Each of these devices (110/120) may include one or more controllers/processors (1302/1402), that may each include a central processing unit (CPU) for processing data and computer-readable instructions, and a memory (1304/1404) for storing data and instructions of the respective device. The memories (1304/1404) may individually include volatile random access memory (RAM), non-volatile read only memory (ROM), non-volatile magnetoresistive (MRAM) and/or other types of memory. Each device may also include a data storage component (1306/1406), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1308/1408). The storage component (1306/1406) may include storage for various data including ASR models 250, NLU knowledge base 273, entity library 282, TTS voice unit storage 372, or other storage used to operate the system.

Computer instructions for operating each device (110/120) and its various components may be executed by the respective device's controller(s)/processor(s) (1302/1402), using the memory (1304/1404) as temporary "working" storage at runtime. A device's computer instructions may be stored in a non-transitory manner in non-volatile memory (1304/1404), storage (1306/1406), or an external device(s). Alternatively, some or all of the executable instructions may be embedded in hardware or firmware on the respective device in addition to or instead of software.

Each device (110/120) includes input/output device interfaces (1308/1408). A variety of components may be connected through the input/output device interfaces, as will be discussed further below. Additionally, each device (110/120) may include an address/data bus (1310/1410) for conveying data among components of the respective device. Each component within a device (110/120) may also be directly connected to other components in addition to (or instead of) being connected to other components across the bus (1310/1410).

Referring to the device 110 of FIG. 13, the input/output device interfaces 1310 connect to a variety of components such as an audio output component such as a speaker 101, a wired headset or a wireless headset (not illustrated) or an audio capture component. The audio capture component may be, for example, a microphone 103 or array of microphones, a wired headset or a wireless headset (not illustrated), etc. If an array of microphones is included, approximate distance to a sound's point of origin may be performed acoustic localization based on time and amplitude differences between sounds captured by different microphones of the array. The microphone 103 may be configured to capture speech including an utterance. The device 110 (using microphone 103, ASR module 250, etc.) may be configured to determine audio data corresponding to the utterance. The device 110 (using input/output device interfaces 1308, antenna 1320, etc.) may also be configured to transmit the audio data to server 120 for further processing.

For example, via the antenna(s) 1320, the input/output device interfaces 1308 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as wakewords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include NLU knowledge base 273 and/or entity library 282, or those storages may be separately located.

One or more servers 120 may also include a command processor 290 that is configured to execute commands associate with an ASR hypothesis as described above. One or more servers 120 may also include a machine learning training component 1470 that is configured to determine one or more of the trained models discussed above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 13 and 14, are exemplary, and may be located a stand-alone device or may be included, in whole or in part, as a component of a larger device or system.

Figure 15:
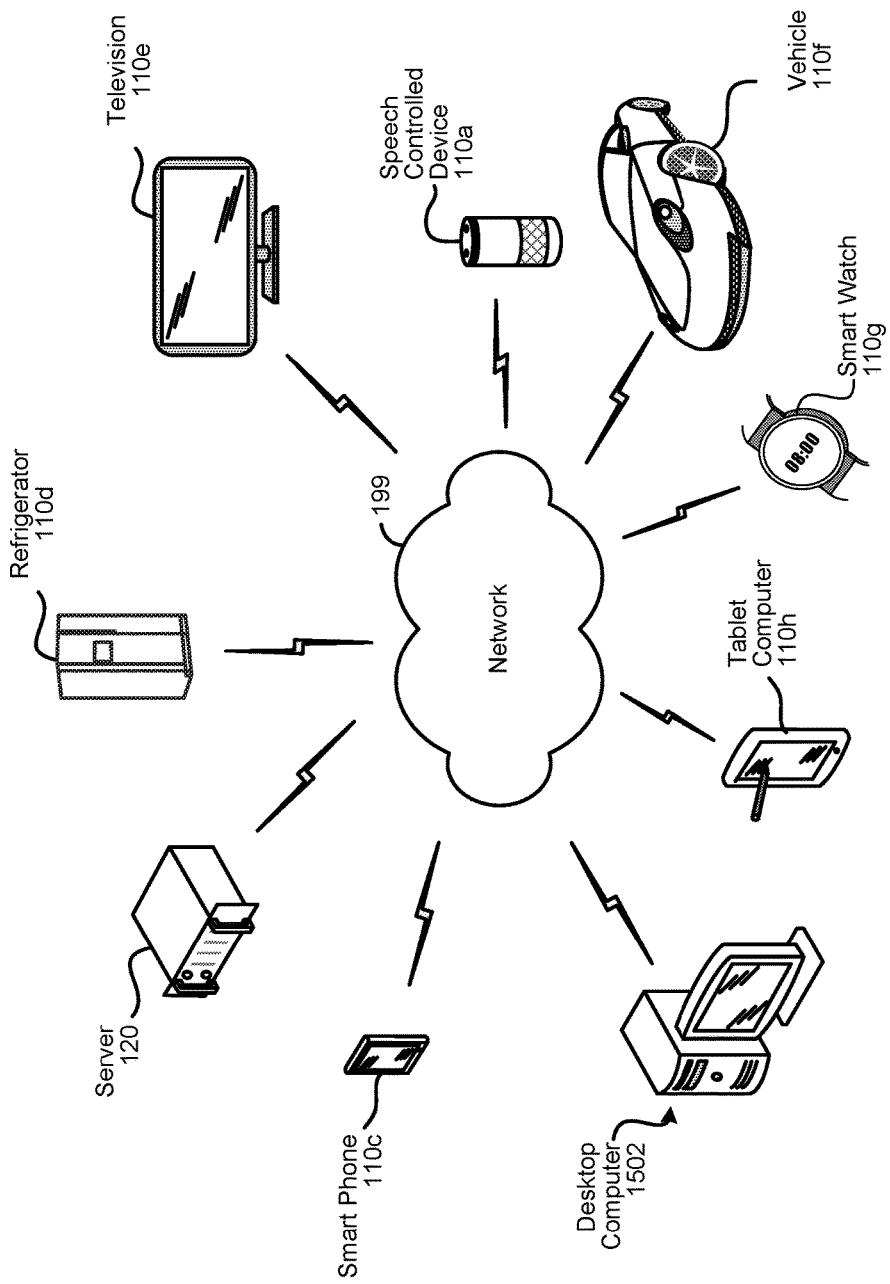
FIG. 15 illustrates an example of a computer network for use with the system.

As illustrated in FIG. 15, multiple devices (110*a-h*, 120, and/or 1502) may contain components of the system 100 and the devices may be connected over a network 199. The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, devices 110, networked computer(s) 1502, etc. may be connected to the network 199 through a wireless service provider, over a WiFi or cellular network connection or the like. Other devices, such as server(s) 120, may connect to the network 199 through a wired connection or wireless connection. Networked devices 110 may capture audio using one-or-more built-in or connected microphones 103 or audio capture devices, with processing performed by ASR, NLU, or other components of the same device or another device connected via network 199, such as ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device, input audio data including a spoken utterance;
   performing speech processing on the input audio data;
   determining the input audio data comprises a message intended for a second device associated with a user profile;
   generating output text data responding to the input audio data, the output text data being based on the input audio data being received from the first device;
   identifying a plurality of stored audio segments associated with the user profile, the stored audio segments comprising speech data previously sent to the first device from the second device;
   performing text-to-speech (TTS) processing on the output text data to generate output audio data, wherein the TTS processing uses the plurality of stored audio segments;
   determining that the user profile is associated with an unavailable indicator associated with the second device, the unavailable indicator being based on the second device being in operation; and
   sending, to the first device in response to determining the user profile is associated with the unavailable indicator, the output audio data.

2. The computer-implemented method of claim 1, further comprising:
   receiving, from a third device, input text data including a text message;
   performing natural language processing on the input text data;
   determining the input text data is intended for the second device;
   generating second output text data responding to the input text data;
   sending, to the third device in response to determining the user profile is associated with the unavailable indicator, the second output text data;
   determining a fourth device associated with the user profile;
   sending, to the fourth device, a first signal causing the fourth device to output content corresponding to the second output text data;
   receiving, from the fourth device, a second signal including an indication of correctness of the second output text; and
   using the indication to inform further generation of output text data.

3. The computer-implemented method of claim 1, further comprising:
   associating, by a first machine learning model, the unavailable indicator with the second device in the user profile based on at least one of determining the second device is outputting multimedia content, determining a calendar application associated with the user profile indicates the second device is presently busy, message content, content of the input audio data, a time of day, determining a do not disturb setting of the second device is activated, or an idle time since a last communication of the second device,
   wherein generating the output text data is performed using a second machine learning model.

4. The computer-implemented method of claim 1, further comprising:
   generating output text data corresponding to a plurality of responses to the input audio data;
   sending, to a third device associated with the user profile, a first signal causing the third device to output text corresponding to the plurality of responses; and
   receiving, from the third device, a second signal including a selection of one of the plurality of responses,
   wherein sending, to the first device, the output audio data occurs in response to receiving the second signal.

5. A system comprising:
   at least one processor; and
   at least one memory including instructions that, when executed by the at least one processor, cause the system to:
   receive, from a first device, input audio data;
   determine the input audio data represents a message intended for a recipient device associated with a recipient profile;
   generate text data corresponding to the input audio data;
   determine the recipient profile is associated with an unavailable indicator;
   identify, in the recipient profile, a prosodic characteristic associated with voice data previously sent to the first device;
   perform, using the prosodic characteristic, text-to-speech processing on the text data to generate output audio data; and
   send, to the first device in response to determining the recipient profile is associated with the unavailable indicator, the output audio data.

6. The system of claim 5, wherein the at least one memory further includes instructions that, when executed by the at least one processor, further cause the system to:
   receive, from a third device, input text data;
   determine the input text data represents a second message intended for the recipient device;
   generate second text data responding to the input text data; and
   send, to the third device in response to determining the recipient profile is associated with the unavailable indicator, the second text data.

7. The system of claim 5, wherein the output audio data comprises stored speech units corresponding to utterances previously spoken by a user associated with the recipient profile.

8. The system of claim 5, wherein the instructions configuring the at least one processor to determine the recipient profile is associated with the unavailable indicator are implemented by a first machine learning model, the first machine learning model determining to send the output audio data based on the recipient device outputting multimedia content, a calendar application indicating the recipient device is presently busy, passed message exchange content, content of the input audio data, an identity of a user that sent the message, a time of day, a do not disturb setting of the recipient device being activated, or idle time since a last communication of the recipient device.

9. The system of claim 8, wherein the instructions configuring the at least one processor to generate response text data are implemented by a second machine learning model, the second machine learning model generating the text data based on the recipient device outputting multimedia content, a calendar application indicating the recipient device is presently busy, passed message exchange content, content of the input audio data, an identity of a user that sent the message, a time of day, a do not disturb setting of the recipient device being activated, or idle time since a last communication of the recipient device.

10. The system of claim 5, wherein the at least one memory further includes instructions that, when executed by the at least one processor, further cause the system to:
cause a second device associated with the recipient profile to output content corresponding to the output audio data;
receive, from the second device, an indication of correctness of the output audio data; and
use the indication to inform future response generation.

11. The system of claim 5, wherein the at least one memory further includes instructions that, when executed by the at least one processor, further cause the system to:
receive, from a third device, second input audio data;
determine the second input audio data represents a second message intended for the recipient device; and
cause, in response to determining the recipient profile is associated with the unavailable indicator, the third device to obtain audio corresponding to a reason for the second message.

12. The system of claim 11, wherein the at least one memory further includes instructions that, when executed by the at least one processor, further cause the system to:
determine the third device is associated with a first user profile; and
determine the first user profile is represented in a current time slot of a calendar application associated with the recipient profile,
wherein causing the third device to obtain the audio is in response to determining the first user profile is represented in the current time slot.

13. A computer-implemented method comprising:
receiving, from a first device, input audio data;
determine the input audio data represents a message intended for a recipient device associated with a recipient profile;
generating text data corresponding to the input audio data;
determining the recipient profile is associated with an unavailable indicator;
identifying, in the recipient profile, a prosodic characteristic associated with voice data previously sent to the first device;
performing, using the prosodic characteristic, text-to-speech processing on the text data to generate output audio data; and
sending, to the first device in response to determining the recipient profile is associated with the unavailable indicator, the output audio data.

14. The computer-implemented method of claim 13, further comprising:
receiving, from a third device, input text data;
determining the input text data represents a second message intended for the recipient device;
generating second text data responding to the input text data; and
sending, to the third device in response to determining the recipient profile is associated with the unavailable indicator, the second text data.

15. The computer-implemented method of claim 13, wherein the output audio data comprises stored speech units corresponding to utterances previously spoken by a user associated with the recipient profile.

16. The computer-implemented method of claim 13, wherein determining the recipient profile is associated with the unavailable indicator is performed by a first machine learning model, the first machine learning model determining to send the output audio data based on the recipient device outputting multimedia content, a calendar application indicating the recipient device is presently busy, passed message exchange content, content of the input audio data, an identity of a user that sent the message, a time of day, a do not disturb setting of the recipient device being activated, or idle time since a last communication of the recipient device.

17. The computer-implemented method of claim 16, wherein generating response text data is performed by a second machine learning model, the second machine learning model generating the text data based on at least the recipient device outputting multimedia content, a calendar application indicating the recipient device is presently busy, passed message exchange content, content of the input audio data, an identity of a user that sent the message, a time of day, a do not disturb setting of the recipient device being activated, or idle time since a last communication of the recipient device.

18. The computer-implemented method of claim 13, further comprising:
causing a second device associated with the recipient profile to output content corresponding to the output audio data;
receiving, from the second device, an indication of correctness of the output audio data; and
using the indication to inform future response generation.

19. The computer-implemented method of claim 13, further comprising:
receiving, from a third device, second input audio data;
determining the second input audio data represents a second message intended for the recipient device; and
causing, in response to determining the recipient profile is associated with the unavailable indicator, the third device to obtain audio corresponding to a reason for the second message.

20. The computer-implemented method of claim 19, further comprising:
determining the third device is associated with a first user profile; and
determining the first user profile is represented in a current time slot of a calendar application associated with the recipient profile, wherein causing the third device to obtain the audio is in response to determining the first user profile is represented in the current time slot.

\* \* \* \* \*